US012770896B2

(12) United States Patent
Miller et al.

(10) Patent No.: US 12,770,896 B2
(45) Date of Patent: Oct. 20, 2026

(54) HEAT EXCHANGER FOR HEATING HYDROGEN

(71) Applicant: GM GLOBAL TECHNOLOGY OPERATIONS LLC, Detroit, MI (US)

(72) Inventors: Ronald Miller, Bloomfield Hills, MI (US); Prafulla Bodke, Maharashtra (IN); Anna S. Bansode, Maharashtra (IN); Chandan AS, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 619 days.

(21) Appl. No.: 18/352,389

(22) Filed: Jul. 14, 2023

(65) Prior Publication Data

US 2025/0023066 A1 Jan. 16, 2025

(51) Int. Cl.

| | |
|---|---|
| ***H01M 8/04029*** | (2016.01) |
| ***F28D 7/08*** | (2006.01) |
| ***F28F 3/02*** | (2006.01) |
| ***F28F 23/00*** | (2006.01) |
| ***H01M 8/0267*** | (2016.01) |

(52) U.S. Cl.

CPC ........ *H01M 8/04029* (2013.01); *F28D 7/082* (2013.01); *F28F 3/02* (2013.01); *F28F 23/00* (2013.01); *H01M 8/0267* (2013.01); *H01M 2250/20* (2013.01)

(58) Field of Classification Search

CPC .... H01M 8/04029; H01M 8/0267; F28F 3/02; F28F 23/00; F28F 7/08

See application file for complete search history.

(56) References Cited

U.S. PATENT DOCUMENTS 10,119,773 B2 11/2018 Martins

FOREIGN PATENT DOCUMENTS

CN 217361663 U 9/2022
JP 2000319003 A * 11/2000 .............. F28F 13/08

* cited by examiner

*Primary Examiner* — Karie O'Neill Apicella
(74) *Attorney, Agent, or Firm* — Quinn IP Law

(57) ABSTRACT

A heat exchanger may include a coolant cavity having a coolant flow path configured for fluidly communicating coolant and a hydrogen cavity having a hydrogen flow path configured for fluidly communicating hydrogen. The hydrogen cavity may include a plurality of fins dispersed in-line throughout. The heat exchanger may further include a housing configured for thermally coupling the coolant cavity with the hydrogen cavity, optionally with the thermal coupling providing conductive heat transfer between the coolant and the hydrogen based at least in part on a portion of the heat transfer occurring through the fins.

20 Claims, 5 Drawing Sheets

HEAT EXCHANGER FOR HEATING HYDROGEN

INTRODUCTION

The present disclosure relates to heat exchangers, such as but not necessarily limited to heat exchangers of the type configured for heating hydrogen for a fuel cell stack of an electrically driven vehicle.

A variety of vehicles may be configured with a propulsion system, powertrain, or other drivetrain having an electric motor or other electrically driven device operable for propelling or otherwise driving the vehicle, typically based at least in part on converting electrical power to mechanical power. Such vehicles may be generically referred to as electric vehicles and include a wide range of capabilities for supporting the conversion of electrical power to mechanical power. Electric vehicles may include differing configurations for generating, storing, and supplying electrical power, with some electric vehicles relying at least partially upon fuel cell systems to perform electrochemical reactions of the type suitable for generating electrical power. Such fuel cell systems may rely upon a fuel cell or other electrochemical device to generate electrical power as a result of hydrogen molecules being split into protons and electrons through a process called electrolysis.

To generate the electricity for driving or otherwise powering an electric vehicle, multiple fuel cells may be combined in series and/or in parallel into a fuel cell stack to achieve a higher output voltage and allow for stronger current draw. Such fuel cell stacks may rely on hydrogen or hydrogen-rich reactant. The hydrogen may be stored onboard or otherwise supplied at a relatively low temperature such that performance and efficiency of the fuel cell system may be improved by heating the hydrogen prior to its use with the fuel cell stack. The ability to heat the hydrogen beforehand may induce the electrochemical reactions to occur more efficiently, improve performance, ameliorate water vapor condensation, and/or improve cold-start capability.

SUMMARY

One non-limiting aspect of the present disclosure relates to a heat exchanger for heating hydrogen, such as but not necessarily for use with a fuel cell system of an electric vehicle. The heat exchanger may be included as part of a fuel cell system to heat hydrogen supplied to a fuel cell stack for purposes of inducing electrochemical reactions of the fuel stack to occur more efficiently, and thereby, improve performance, ameliorate water vapor condensation, and/or improve cold-start capability.

One non-limiting aspect of the present disclosure relates a heat exchanger for a fuel cell system of an electric vehicle. The heat exchanger may include a coolant cavity having a coolant flow path configured for fluidly communicating coolant between at least one coolant inlet and at least one coolant outlet and a hydrogen cavity having a hydrogen flow path configured for fluidly communicating hydrogen between at least one hydrogen inlet and at least one hydrogen outlet. The hydrogen cavity may include a plurality of fins dispersed in-line throughout a serpentine section of the hydrogen flow path. The heat exchanger may further include a housing configured for thermally coupling the coolant cavity with the hydrogen cavity. The thermal coupling may provide conductive heat transfer between the coolant and the hydrogen with at least a portion of the heat transfer occurring through the fins.

The serpentine section may be configured for directing the hydrogen through a plurality of channels layered vertically from top-to-bottom heightwise across the hydrogen cavity.

The serpentine section may include a plurality of shelves configured for defining switchbacks between the channels, optionally with the switchbacks directing the hydrogen through the serpentine section in a back-and-forth manner from a side-to-side widthwise across the hydrogen cavity.

Each shelf may include an open end configured for defining a fluid turn for one of the switchbacks and a closed end configured for adhering to one of a first sidewall and a second sidewall of the hydrogen cavity.

The fins may be configured to extend from front-to-rear depthwise across the hydrogen cavity.

The fins may be oval shaped.

The fins may occupy more than half of a volume of the serpentine section.

The housing may include a dividing wall for fluidly isolating the coolant cavity from the hydrogen cavity, the dividing wall configured for orientating the coolant cavity back-to-back with the hydrogen cavity.

The fins may be integrated with the dividing wall.

The serpentine section may be configured for directing the hydrogen in a back-and-forth manner from a side-to-side widthwise through a plurality of channels layered vertically from top-to-bottom heightwise across the hydrogen cavity.

The fins may be configured for extending from front-to-rear depthwise between a forward side and a rearward side of the channels such that a rearward end of each fin may be integrated with the dividing wall and a forward end of each fin is attached or proximate to a forward wall of the hydrogen cavity.

The at least one coolant inlet may include no more than a first inlet and the at least one coolant outlet includes no more than a first outlet, with the coolant flow path between the first inlet and the first outlet is shaped to mirror the serpentine section of the hydrogen flow path.

The at least one coolant inlet may include a first inlet and a second inlet. The at least one coolant outlet may include a first outlet and a second outlet. The coolant flow path may include a first path corresponding with a first portion of the coolant flow path between the first inlet and the first outlet and a second path corresponding with a second portion of the coolant flow path between the second inlet and the second outlet, optionally with the first path shaped to mirror an upper portion of the serpentine section of the hydrogen flow path and the second path shaped to mirror a lower portion of the serpentine section of the hydrogen flow path.

One non-limiting aspect of the present disclosure relates to a heat exchanger for a fuel cell system of an electric vehicle. The heat exchange may include a coolant cavity having a coolant flow path configured for fluidly communicating coolant and a hydrogen cavity having a hydrogen flow path configured for fluidly communicating hydrogen. The hydrogen cavity may include a plurality of fins dispersed in-line throughout. The heat exchanger may further include a housing configured for thermally coupling the coolant cavity with the hydrogen cavity. The thermal coupling may provide conductive heat transfer between the coolant and the hydrogen with at least a portion of the heat transfer occurring through the fins.

The hydrogen flow path may include a serpentine section configured for directing the hydrogen in a back-and-forth manner from a side-to-side widthwise through a plurality of channels layered vertically from top-to-bottom heightwise across the hydrogen cavity.

The housing may include a dividing wall for fluidly isolating the coolant cavity from the hydrogen cavity, the dividing wall configured for orientating the coolant cavity back-to-back with the hydrogen cavity.

The fins may be configured for extending from front-to-rear depthwise between a forward side and a rearward side of the channels such that a rearward end of each fin is integrated with the dividing wall and a forward end of each fin is attached or proximate to a forward wall of the hydrogen cavity.

One non-limiting aspect of the present disclosure relates to a heat exchanger for a fuel cell system of an electric vehicle. The heat exchanger may include a coolant cavity having a coolant flow path configured for fluidly circulating coolant at a first temperature and a hydrogen cavity having a hydrogen flow path configured for fluidly circulating hydrogen at a second temperature less than the first temperature. The hydrogen cavity may include a plurality of arcuate shaped fins dispersed in-line throughout a serpentine section, the serpentine section configured for directing the hydrogen in a back-and-forth manner from a side-to-side widthwise through a plurality of channels layered vertically from top-to-bottom heightwise across the hydrogen cavity. The heat exchanger may further include a housing for the coolant cavity and the hydrogen cavity. The housing may include a dividing wall configured for fluidly isolating and thermally coupling the coolant cavity back-to-back with the hydrogen cavity. The fins may be integrated with a dividing wall to facilitate conductive heat transfer between the coolant and the hydrogen.

The hydrogen cavity may include one inlet to the hydrogen flow path and two or more outlets from the hydrogen flow path.

The serpentine section may include a plurality of shelves configured for defining switchbacks between the channels.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
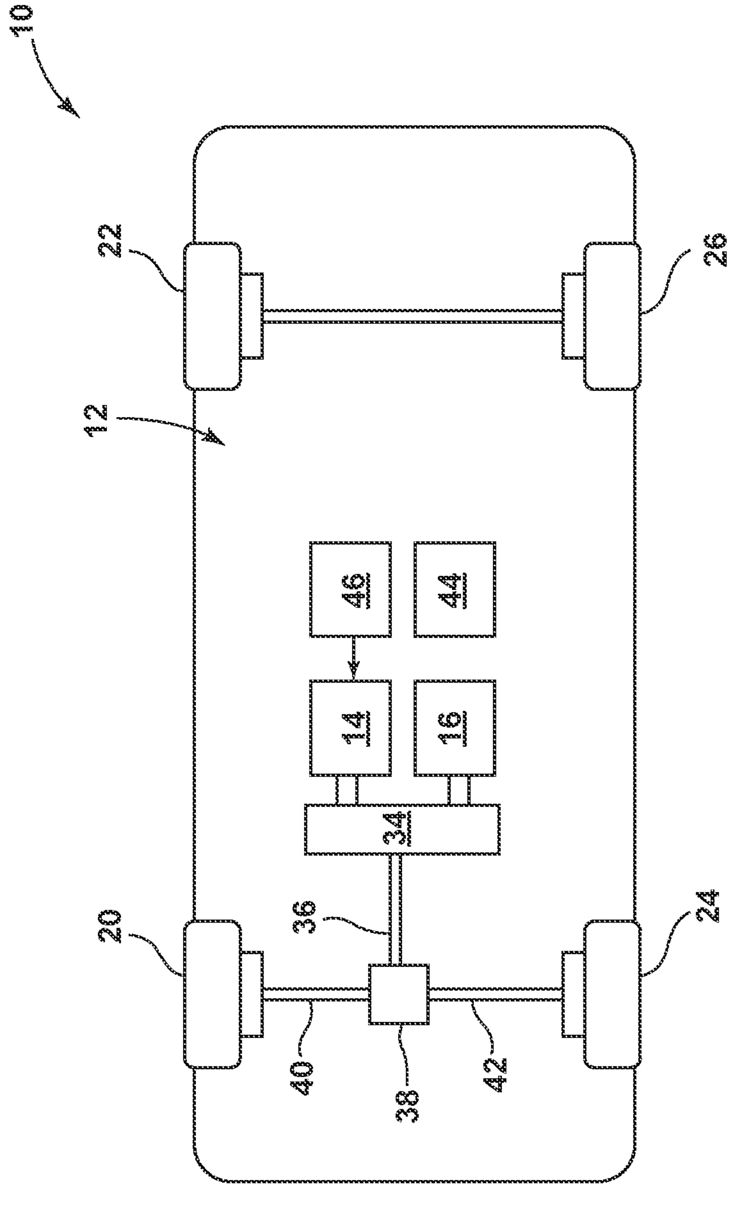
FIG. 1 illustrates a schematic view of a vehicle in accordance with one non-limiting aspect of the present disclosure.

FIG. 1 illustrates a schematic view of a vehicle 10 in accordance with one non-limiting aspect of the present disclosure. The vehicle 10 may be configured with a propulsion system, powertrain, or other drivetrain 12 having an electric motor 14 or other electrically driven device operable for propelling or otherwise driving the vehicle 10. The vehicle 10 is illustrated for exemplary non-limiting purposes as being of a hybrid type due to the powertrain 12 optionally including an internal combustion engine (ICE) 16. The ICE 16 and the electric motor 14, or other device configured to convert electrical power to mechanical power, may cooperate to provide rotational force/torque to one or more of a plurality of wheels 20, 22, 24, 26. The powertrain 12 may include a transmission 34, a driveshaft 36, a differential 38, axles 40, 42, and/or other componentry to facilitate conveying rotative force from the ICE 16 and/or the motor 14 to the wheels 20, 22, 24, 26. The vehicle 10 is shown to include the powertrain 12 configured to connect the ICE 16 and the motor 14 to the front wheels 20, 24 for non-limiting purposes as the present disclosure fully contemplates its use and application with four-wheel drive automobiles and other, non-automobile types of vehicles. A controller 44 may be configured to generate control signals associated with directing and otherwise implementing desired control of the powertrain 12, the motor 14, the ICE 16, and/or other features of the vehicle 10.

Figure 2:
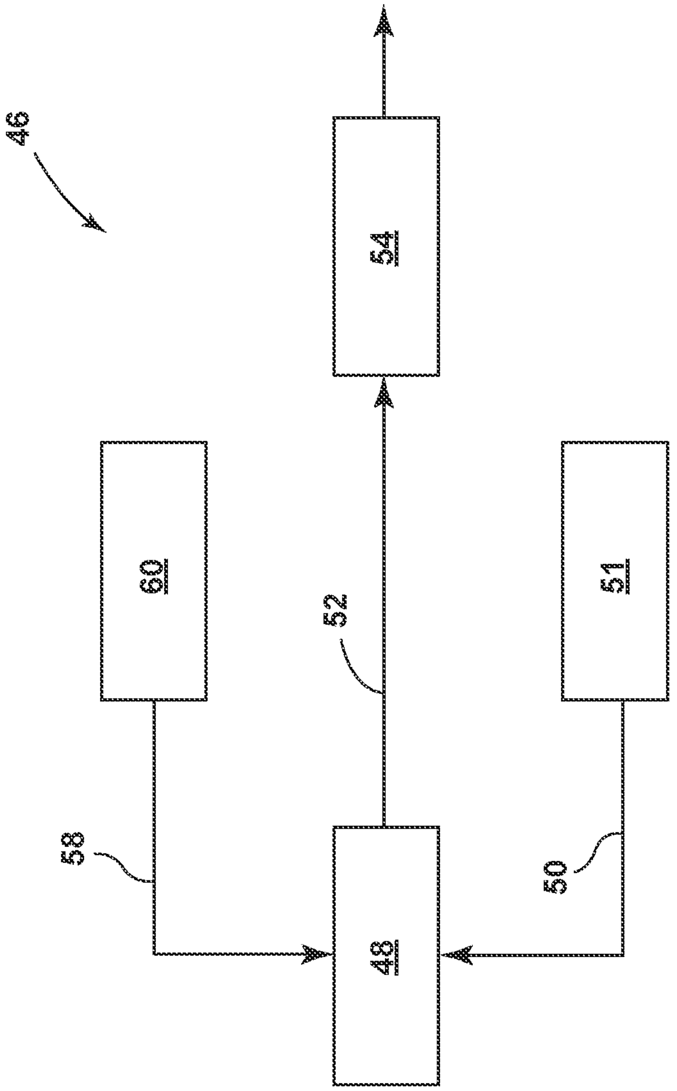
FIG. 2 illustrates a schematic view of a fuel cell system in accordance with one non-limiting aspect of the present disclosure.

The vehicle 10 is presented for non-limiting purposes as being representative of a wide variety of vehicles and/or other devices that may rely on converting electrical power to mechanical power. Such vehicles may be generically referred to as electric vehicles and include a wide range of capabilities for supporting the conversion of electrical power to mechanical power. The vehicle 10 is contemplated to include differing configurations for generating, storing, and supplying electrical power to the electric motor 14 and/or other devices or system onboard the vehicle 10. One non-limiting aspect of the present disclosure relates to the electrical power being provided at least based in part on electrical power derived from a fuel cell system 46. The fuel cell system 46 may be configured to generate electrical power by relying at least partially upon electrochemical reactions of the type suitable for generating electrical power. FIG. 2 illustrates a schematic view of the fuel cell system 46 in accordance with one non-limiting aspect of the present disclosure. The fuel cell system 46 may include a heat exchanger 48, or what may be referred to as a fuel rail attenuating volume (FRAV), may be configured to receive hydrogen 50 from a source 51 and output heated hydrogen 52 prior to delivery to a fuel cell, a fuel cell stack, or other electrochemical device 54. The fuel cell stack 54 may in turn rely upon the heated hydrogen 52 to provide electrical power as a result of hydrogen molecules being split into protons and electrons through a process called electrolysis.

The fuel cell stack 54 may be of the type commonly employed in automotive related applications, such as but not necessarily limited to a fuel cell stack 54 that may utilize a solid polymer electrolyte membrane (PEM)—also referred to as a "proton exchange membrane" (PEM)—to facilitate the electrolysis process by providing an ion transport between an anode and a cathode. Proton exchange membrane fuel cells (PEMFC) may employ a solid polymer electrolyte (SPE) proton-conducting membrane, such as a perfluorosulfonic acid membrane. The anode and cathode (not shown in detail) of the fuel cell stack 54 may include dispersed catalytic particles, such as platinum, supported on carbon particles and mixed with an ionomer. This catalytic mixture may be deposited on the sides of the membrane to form anode and cathode layers. The combination of the anode catalytic layer, cathode catalytic layer, and electrolyte membrane may define a membrane electrode assembly (MEA) in which the anode catalyst and cathode catalyst are supported on opposite faces of the ion conductive solid polymer membrane. The fuel cell stack 54 may include a plurality of individual fuel cells, which may number in the hundreds.

The capability of the heat exchanger 48 to heat the hydrogen 52 for the fuel cell stack 54 may induce the electrochemical reactions thereat to occur more efficiently, improve performance, ameliorate water vapor condensation, and/or improve cold-start capability. One non-limiting aspect of the present disclosure contemplates heating the hydrogen 50 with coolant 58 supplied from a coolant source 60. The hydrogen source 51 may be configured to provide the hydrogen 50 at a first temperature, which may be lower than a second temperature of the coolant. The heat exchanger 48 may be configured to facilitate a thermal exchange between the coolant 58 and the hydrogen 50 such that the elevated temperature of the coolant 58 may be used to heat the hydrogen 50, such as via conductive heat transfer therebetween. The coolant source 60 and/or the hydrogen source 51 may be included onboard the vehicle 10, standalone sources, or in the event the heat exchanger 48 is used outside of vehicle 10, from other sources. The coolant source 60, for example, may be operable with additional systems onboard the vehicle 10, such as the ICE 16, whereby the coolant 58 may flow through the ICE 16 to be heated and thereafter circulated through the heat exchanger 48 for purposes of heating the hydrogen 50.

Figure 4:
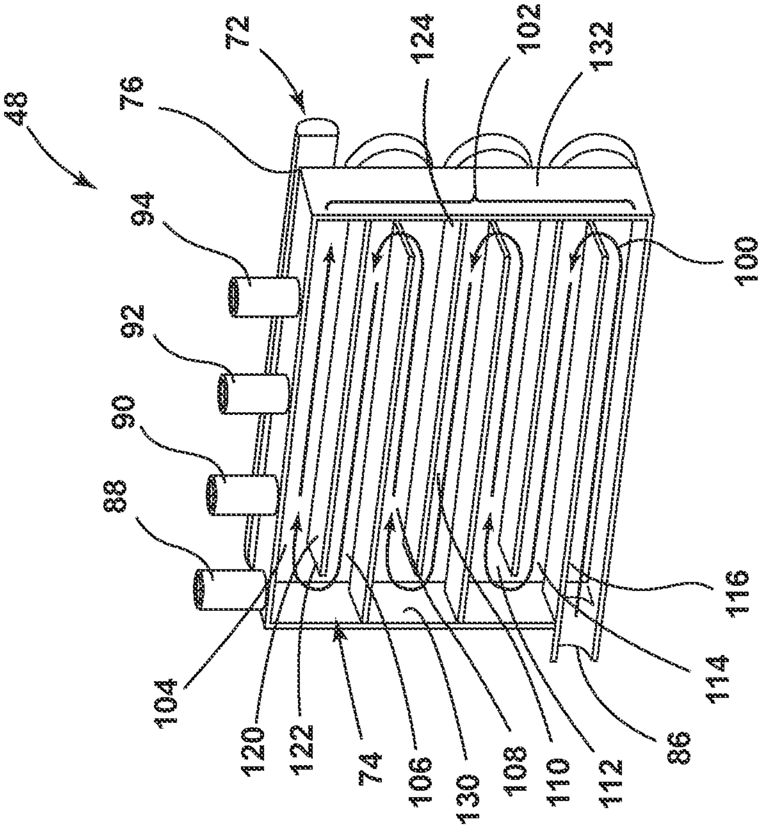
FIG. 4 illustrates a partial schematic view of the heat exchanger in accordance with one non-limiting aspect of the present disclosure.
Figure 3:
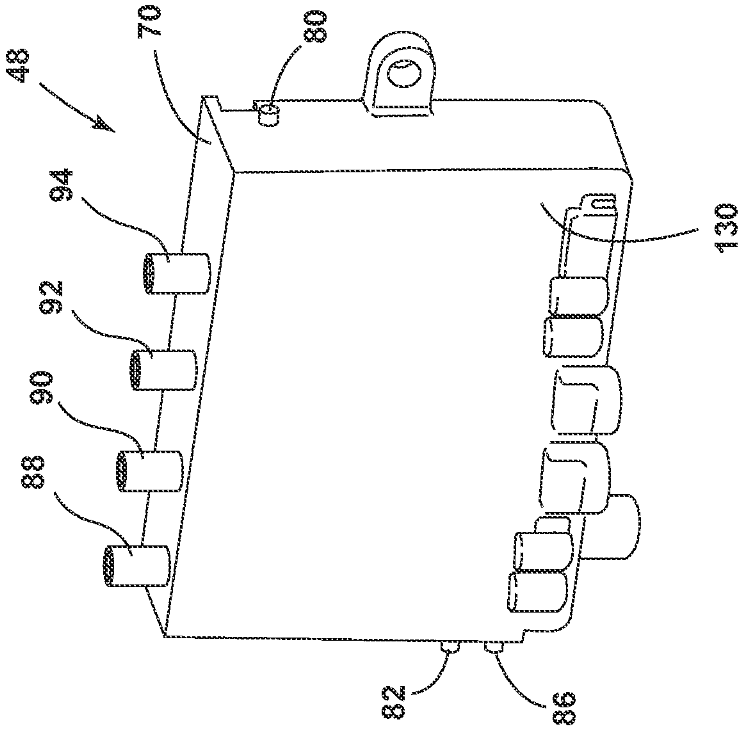
FIG. 3 illustrates a perspective schematic view of a heat exchanger in accordance with one non-limiting aspect of the present disclosure.

FIG. 3 illustrates a perspective schematic view of the heat exchanger 48 in accordance with one non-limiting aspect of the present disclosure. The heat exchanger 48 may include a housing 70 configured to facilitate conductive heating of the hydrogen 50 via heat transfer with the coolant 58. FIG. 4 illustrates a partial schematic view of the heat exchanger 48 in accordance with one non-limiting aspect of the present disclosure. The housing 70 may be configured in the illustrated manner to include a coolant cavity 72 and a hydrogen cavity. The housing 70 may include a dividing boundary, wall, or other structure 76 configured for positioning the coolant cavity 72 back-to-back with the hydrogen cavity 74, which may be beneficial in maximizing thermal transference therebetween. The dividing wall 76 may be used in this manner to facilitate fluidly isolating the fluid coolant cavity 72 from the hydrogen cavity 74 while thermally coupling the fluid cavity with the hydrogen cavity 74. The housing 70 is described with respect to including the dividing wall 76 for separating the coolant cavity 72 from the hydrogen cavity 74 for illustrative purposes and without intending to impart structural limitations. The housing 70, for example, may be a unitary structure whereby the coolant cavity 72, the hydrogen cavity 74, and the dividing wall 76 may be formed as a singular piece, or a multiple component structure whereby the coolant cavity 72, the hydrogen cavity 74, the dividing wall, and/or other components may be assembled together.

The coolant cavity 72 may be part of a coolant structure and the hydrogen cavity 74 may be part of a hydrogen structure, which may be joined together or otherwise affixed to each other to define the dividing wall 76 and other structures of the housing 70 in illustrated manner. The heat exchanger 48 may be illustrated to include a coolant inlet 80 and a coolant outlet 82 for the coolant cavity 72 and a hydrogen inlet 86 and a plurality of hydrogen outlets 88, 90, 92, 94 for the hydrogen cavity 74. This is done for non-limiting purposes as the present disclosure fully contemplates the coolant and/or hydrogen cavities 72, 74 including more or less inlets and outlets. The illustrated configuration is presented to demonstrate advantageous capabilities of the heat exchanger 48 to operate in a common automotive environment whereby hydrogen 50 may be provided from the hydrogen source 51 via the hydrogen inlet 86 and thereafter distributed through multiple hydrogen outlets 88, 90, 92, 94 after being heated, such as to facilitate the hydrogen outlets 88, 90, 92, 94 each communicating the heated hydrogen 52 to corresponding portions of the fuel cell stack 54.

The hydrogen cavity 74 may define a hydrogen flow path 100 between the hydrogen inlet 86 and outlets. The hydrogen flow path 100 may be defined in the illustrated manner to include a serpentine section 102 configured for directing hydrogen 52 through a plurality of channels 104, 106, 108, 110, 112, 114, 116 layered vertically from top-to-bottom heightwise across the hydrogen cavity 74. The serpentine section 102 may include a plurality of shelves 120 configured for defining switchbacks between the channels 104, 106, 108, 110, 112, 114, 116. The switchbacks may be configured for directing the hydrogen 52 through the serpentine section 102 in a back-and-forth manner from the side to side, widthwise across the hydrogen cavity 74. The serpentine flow of hydrogen 52 through the hydrogen cavity 74 may be beneficial in maximizing exposure of the hydrogen 52 to thermal transference with the coolant cavity 72. The shelves 120 may include an open end 122 for defining a fluid turn for one of switchbacks and a closed end 124 configured for adhering to one of a first side wall 130 and second side wall 132 of the hydrogen cavity 74. The shelves 120 may include other shapes and configurations, such as conduit, to define the switchbacks, optionally in the illustrated manner whereby pressure drop may be minimized while maximizing exposure of the hydrogen 52 to thermal transference with the coolant cavity 72.

Figure 6:
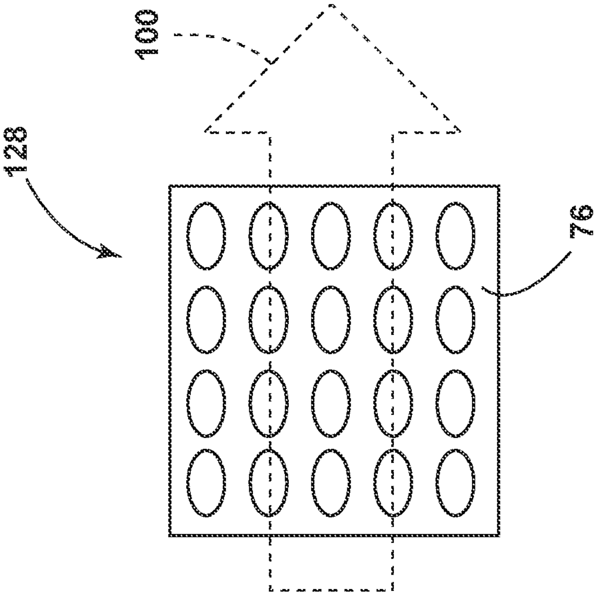
FIG. 6 illustrates a partial, schematic end view of the fins in accordance with one non-limiting aspect of the present disclosure.
Figure 5:
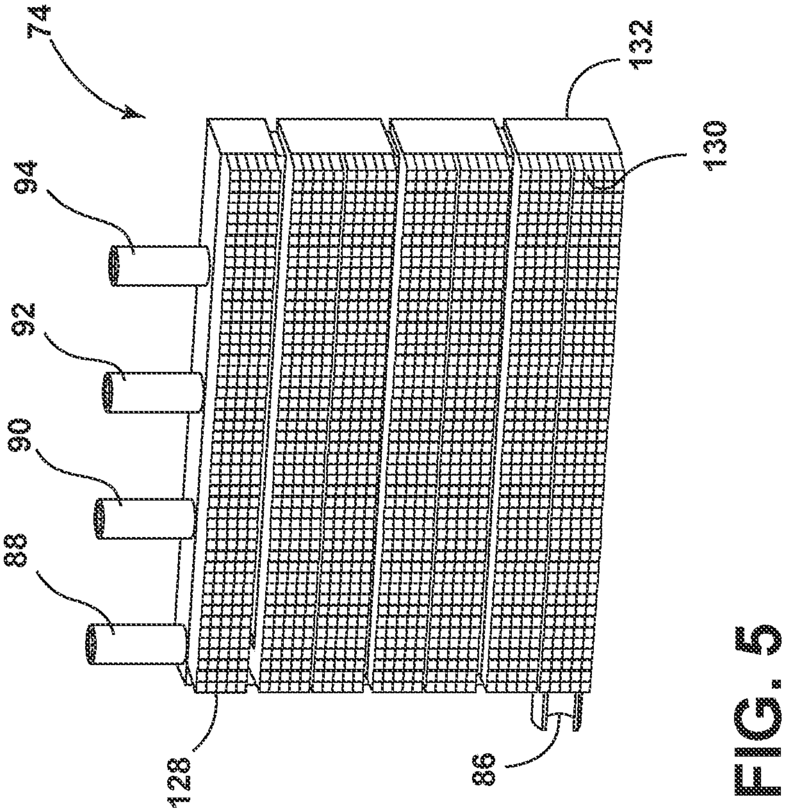
FIG. 5 illustrates a partial schematic view of a hydrogen cavity including fins in accordance with one non-limiting aspect of the present disclosure.

FIG. 5 illustrates a partial schematic view of the hydrogen cavity 74 including fins 128 in accordance with one non-limiting aspect of the present disclosure. The fins 128 may be optionally included to occupy more than half of a volume of the serpentine section 102 and/or elsewhere within the hydrogen cavity 74 to further facilitate the transfer with the coolant cavity 72. The fins 128 may be configured for extending from front-to-rear, depthwise between a forward side 130 and a rearward side 132 of the channels 104, 106, 108, 110, 112, 114, 116. A rearward end of each fin 128 may be integrated with or otherwise sealed against the dividing wall 76, i.e., rearward side 132, and a forward end of each fin 128 may be integrated with or otherwise sealed against the forward wall 130. FIG. 6 illustrates a partial, schematic end view of the fins 128 in accordance with one non-limiting aspect of the present disclosure. The end view illustrates the fins 128 extending from the dividing wall 76, i.e., rearward side 132. The fins 128 may be correspondingly configured to include a generally arcuate shape, such as with the illustrated oval shape. The oval shaped fins 128 may be beneficial in ameliorating vertices, pressure differentials, and other fluid disruptions to the hydrogen 52 flowing there past. The present disclosure, however, fully contemplates the fins 128 including additional shapes and sizes, including fins 128 that may not stretch across an entire depth of the fluid flow path 100. This placement of the fins 128 in-line with the fluid flow path 100 may be beneficial in maximizing exposure of the hydrogen 50 to material cooled and interfaced with the coolant cavity 72.

Figure 7:
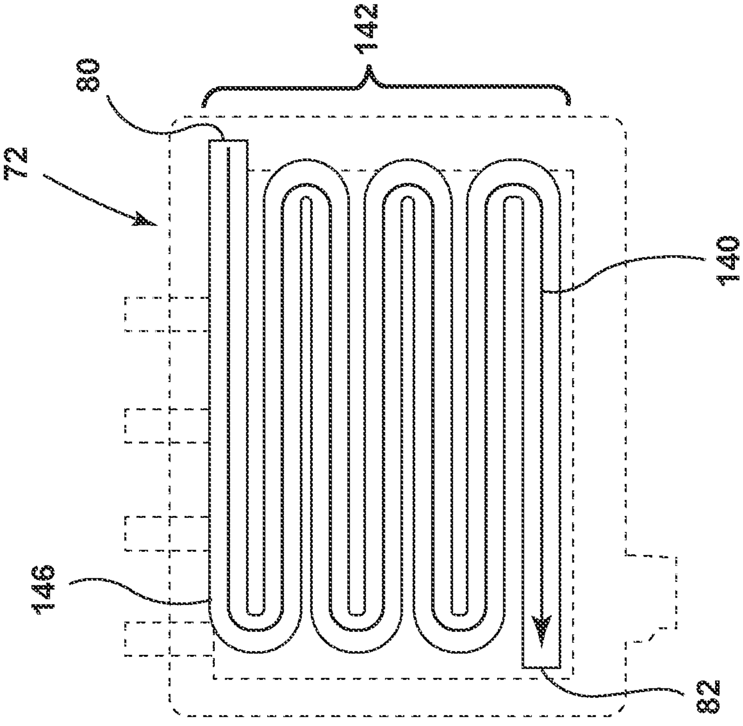
FIG. 7 illustrates a partial schematic view of the coolant cavity in accordance with one non-limiting aspect of the present disclosure.

FIG. 7 illustrates a partial schematic view of the coolant cavity 72 in accordance with one non-limiting aspect of the present disclosure whereby the coolant cavity 72 may define a coolant flow path 140 between the coolant inlet and outlets 80, 82. The coolant flow path 140 may be defined in the illustrated manner to include a winding section 142 configured for directing coolant 58 through a conduit 146 layered vertically from top-to-bottom heightwise across the coolant cavity 72. The winding section 142 may be shaped to mirror the serpentine section 102 of the hydrogen flow path 100, optionally using the conduit 146 or other flow directing features instead of the shelves 120. The mirroring of the coolant flow path 140 with the hydrogen flow path 100 may be beneficial in maximizing exposure of the hydrogen 52 to thermal transference with the coolant cavity 72.

Figure 8:
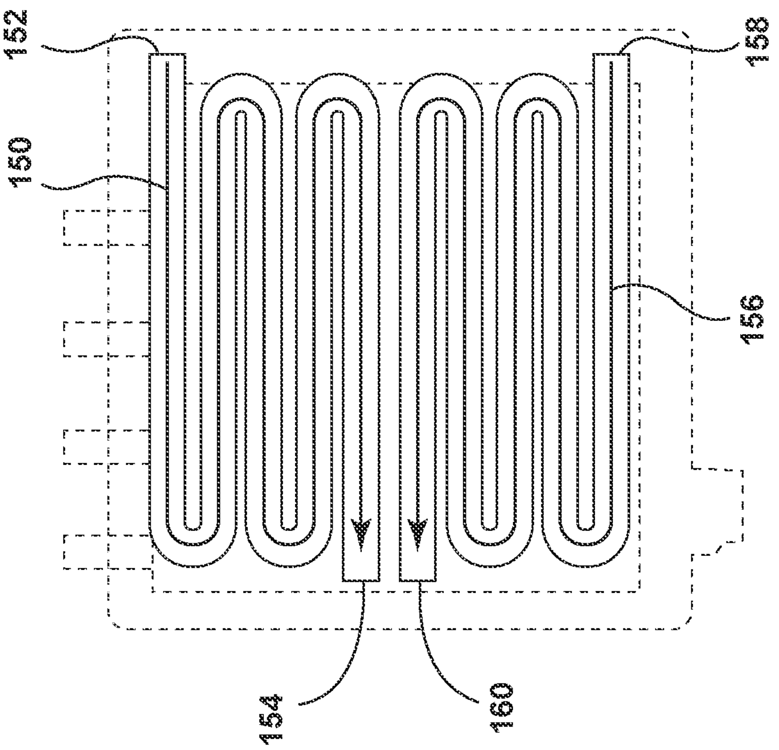
FIG. 8 illustrates a partial schematic view of the coolant cavity in accordance with another non-limiting aspect of the present disclosure.

FIG. 8 illustrates a partial schematic view of the coolant cavity 72 in accordance with non-limiting aspect of the present disclosure whereby a first coolant flow path 150 may correspond with a first portion between a first coolant inlet 152 and a first coolant outlet 154 and a second path 156 may correspond with a second portion between a second coolant inlet 158 and a second coolant outlet 160. The first path 150 may be shaped to mirror an upper portion of the serpentine section 102 of the hydrogen flow path 100 and the second path 156 may be shaped to mirror a lower portion of the serpentine section 102 of the hydrogen flow path 100. The additional, second path 156 may be beneficial in ameliorating a distance the coolant 58 travels through the coolant cavity 72, which may in turn allow more heated coolant 58 to be interfaced with the fluid flow hydrogen cavity 74 to further enhance thermal transference with the hydrogen 50. The hydrogen flow path 100 may optionally be configured in a similar manner to include multiple paths.

As supported above, the present disclosure relates to addressing a need for heating hydrogen gas from a low temperature before it goes to a fuel stack 54. The heat exchanger 48 may be designed in the illustrated manner to provide a serpentine hydrogen flow path 100 operable for channelizing the hydrogen flow to increase the heat transfer rate. The fins 128 may be inserted in this hydrogen path to increase the heat transfer area and help in reaching the desired hydrogen temperature. The fins 128 may be oval shaped (major axis in flow direction) placed in 'in-line' configuration in the hydrogen path, which may be helpful in imposing less restriction to the flow of hydrogen 52. The coolant flow path 140, 150, 156 carrying the coolant 58 may be at high temperature (about 72° C.) and placed back-to-back with the hydrogen path 100 for efficient heat transfer. Hydrogen temperature of 55° C. may be achieved with 3.1 g/s hydrogen flow rate, an inlet hydrogen temperature of −45° C., and an outlet hydrogen temperature of up to 55° C.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A heat exchanger for a fuel cell system of an electric vehicle, comprising:

a coolant cavity having a coolant flow path configured for fluidly communicating coolant between at least one coolant inlet and at least one coolant outlet;

a hydrogen cavity having a hydrogen flow path configured for fluidly communicating hydrogen between at least one hydrogen inlet and at least one hydrogen outlet, the hydrogen cavity including a plurality of fins dispersed in-line throughout a serpentine section of the hydrogen flow path; and a housing configured for thermally coupling the coolant cavity with the hydrogen cavity, the thermal coupling providing conductive heat transfer between the coolant and the hydrogen with at least a portion of the heat transfer occurring through the fins;

wherein:

the at least one coolant inlet includes a first inlet and a second inlet;

the at least one coolant outlet includes a first outlet and a second outlet; and the coolant flow path includes a first path corresponding with a first portion of the coolant flow path between the first inlet and the first outlet and a second path corresponding with a second portion of the coolant flow path between the second inlet and the second outlet, with the first path shaped to mirror an upper portion of the serpentine section of the hydrogen flow path and the second path shaped to mirror a lower portion of the serpentine section of the hydrogen flow path.

2. The heat exchanger according to claim 1, wherein:

the serpentine section is configured for directing the hydrogen through a plurality of channels layered vertically from top-to-bottom heightwise across the hydrogen cavity.

3. The heat exchanger according to claim 2, wherein:

the serpentine section includes a plurality of shelves configured for defining switchbacks between the channels, the switchbacks directing the hydrogen through the serpentine section in a back-and-forth manner from a side-to-side widthwise across the hydrogen cavity.

4. The heat exchanger according to claim 3, wherein:

each of the shelves includes an open end configured for defining a fluid turn for one of the switchbacks and a closed end configured for adhering to one of a first sidewall and a second sidewall of the hydrogen cavity.

5. The heat exchanger according to claim 4, wherein:

the fins are configured to extend from front-to-rear depthwise across the hydrogen cavity.

6. The heat exchanger according to claim 5, wherein:

the fins are oval shaped.

7. The heat exchanger according to claim 6, wherein:

the fins occupy more than half of a volume of the serpentine section.

8. The heat exchanger according to claim 1, wherein:

the housing includes a dividing wall for fluidly isolating the coolant cavity from the hydrogen cavity, the dividing wall configured for orientating the coolant cavity back-to-back with the hydrogen cavity.

9. The heat exchanger according to claim 8, wherein:

the fins are integrated with the dividing wall.

10. The heat exchanger according to claim 8, wherein:

the serpentine section is configured for directing the hydrogen in a back-and-forth manner from a side-to-side widthwise through a plurality of channels layered vertically from top-to-bottom heightwise across the hydrogen cavity.

11. The heat exchanger according to claim 10, wherein:

the fins are configured for extending from front-to-rear depthwise between a forward side and a rearward side of the channels such that a rearward end of each fin is integrated with the dividing wall and a forward end of each fin is attached or proximate to a forward wall of the hydrogen cavity.

12. The heat exchanger according to claim 1, wherein:

the at least one coolant inlet includes no more than a first inlet and the at least one coolant outlet includes no more than a first outlet, with the coolant flow path between the first inlet and the first outlet is shaped to mirror the serpentine section of the hydrogen flow path.

13. A heat exchanger for a fuel cell system of an electric vehicle, comprising:

a coolant cavity having a coolant flow path configured for fluidly communicating coolant;

a hydrogen cavity having a hydrogen flow path configured for fluidly communicating hydrogen, the hydrogen cavity including a plurality of fins dispersed in-line throughout and including one inlet to the hydrogen flow path and two or more outlets from the hydrogen flow path; and a housing configured for thermally coupling the coolant cavity with the hydrogen cavity, the thermal coupling providing conductive heat transfer between the coolant and the hydrogen with at least a portion of the heat transfer occurring through the fins.

14. The heat exchanger according to claim 13, wherein:

the hydrogen flow path includes a serpentine section configured for directing the hydrogen in a back-and-forth manner from a side-to-side widthwise through a plurality of channels layered vertically from top-to-bottom heightwise across the hydrogen cavity.

15. The heat exchanger according to claim 14, wherein:

the housing includes a dividing wall for fluidly isolating the coolant cavity from the hydrogen cavity, the dividing wall configured for orientating the coolant cavity back-to-back with the hydrogen cavity.

16. The heat exchanger according to claim 15, wherein:

the fins are configured for extending from front-to-rear depthwise between a forward side and a rearward side of the channels such that a rearward end of each fin is integrated with the dividing wall and a forward end of each fin is attached or proximate to a forward wall of the hydrogen cavity.

17. A heat exchanger for a fuel cell system of an electric vehicle, comprising:

a coolant cavity having a coolant flow path configured for fluidly circulating coolant at a first temperature;

a hydrogen cavity having a hydrogen flow path configured for fluidly circulating hydrogen at a second temperature less than the first temperature, the hydrogen cavity including a plurality of arcuate shaped fins dispersed in-line throughout a serpentine section, the serpentine section configured for directing the hydrogen in a back-and-forth manner from a side-to-side widthwise through a plurality of channels layered vertically from top-to-bottom heightwise across the hydrogen cavity; and a housing for the coolant cavity and the hydrogen cavity, the housing including a dividing wall configured for fluidly isolating and thermally coupling the coolant cavity back-to-back with the hydrogen cavity, the fins being integrated with dividing wall to facilitate conductive heat transfer between the coolant and the hydrogen.

18. The heat exchanger according to claim 17, wherein:

the hydrogen cavity includes one inlet to the hydrogen flow path and two or more outlets from the hydrogen flow path.

19. The heat exchanger according to claim 18, wherein: the serpentine section includes a plurality of shelves configured for defining switchbacks between the channels.

20. The heat exchanger according to claim 18, wherein: the coolant flow path is configured for fluidly communicating coolant between at least one coolant inlet and at least one coolant outlet;

the at least one coolant inlet includes a first inlet and a second inlet;

the at least one coolant outlet includes a first outlet and a second outlet; and the coolant flow path includes a first path corresponding with a first portion of the coolant flow path between the first inlet and the first outlet and a second path corresponding with a second portion of the coolant flow path between the second inlet and the second outlet, with the first path shaped to mirror an upper portion of the serpentine section of the hydrogen flow path and the second path shaped to mirror a lower portion of the serpentine section of the hydrogen flow path.

* * * * *